(12) United States Patent
Periasamy et al.

(10) Patent No.: US 8,707,877 B2
(45) Date of Patent: Apr. 29, 2014

(54) SOLID FUEL AND OXYGEN COMBUSTION WITH LOW NOX AND EFFICIENT BURNOUT

(75) Inventors: Chendhil Periasamy, Bear, DE (US); Yuan Xue, Wilmington, DE (US); Taekyu Kang, Newark, DE (US); Remi Pierre Tsiava, Saint Germain-les-Corbeil (FR)

(73) Assignees: L'Air Liquide, Societe Anonyme pour l'Etude et l'Exploitation des Procedes Georges Claude, Paris (FR); American Air Liquide, Inc., Fremont, CA (US)

( * ) Notice: Subject to any disclaimer, the term of this patent is extended or adjusted under 35 U.S.C. 154(b) by 23 days.

(21) Appl. No.: 13/153,455

(22) Filed: Jun. 5, 2011

(65) Prior Publication Data
US 2012/0304905 A1 Dec. 6, 2012

(51) Int. Cl.
F23D 1/00 (2006.01)

(52) U.S. Cl.
USPC .............................. 110/347; 110/265; 110/348

(58) Field of Classification Search
USPC .................... 110/347, 232, 265, 341, 348
See application file for complete search history.

(56) References Cited

U.S. PATENT DOCUMENTS

| | | | | |
|---|---|---|---|---|
| 4,350,103 A | * | 9/1982 | Poll | 110/264 |
| 4,412,810 A | * | 11/1983 | Izuha et al. | 431/186 |
| 4,556,384 A | | 12/1985 | Laurenceau et al. | |
| 5,685,242 A | * | 11/1997 | Narato et al. | 110/262 |
| 5,743,723 A | * | 4/1998 | Iatrides et al. | 431/8 |
| 5,806,443 A | * | 9/1998 | Kobayashi et al. | 110/262 |
| 6,715,432 B2 | * | 4/2004 | Tsumura et al. | 110/261 |
| 7,225,746 B2 | * | 6/2007 | Kobayashi et al. | 110/345 |
| 7,430,970 B2 | * | 10/2008 | LaRue et al. | 110/347 |
| 7,717,701 B2 | * | 5/2010 | D'Agostini et al. | 431/9 |
| 2004/0001788 A1 | | 1/2004 | Marin et al. | |
| 2007/0144415 A1 | * | 6/2007 | Varagani et al. | 110/347 |
| 2008/0286707 A1 | * | 11/2008 | Panesar et al. | 431/10 |
| 2009/0280442 A1 | | 11/2009 | Varagani et al. | |
| 2010/0316969 A1 | | 12/2010 | Amirat et al. | |

FOREIGN PATENT DOCUMENTS

| | | |
|---|---|---|
| DE | 94 14 301 | 2/1995 |
| WO | WO 2011/051463 | 5/2011 |
| WO | WO 2011/051464 | 5/2011 |

OTHER PUBLICATIONS

Glarborg, et al., "Fuel Nitrogen Conversion in Solid Fuel Fired Systems," Prog Energy Combust Sci 2003, 29 (2), pp. 89-113.
Liu, et al., "Pulverized Coal Combustion in Air and in O2/CO2 Mixtures with NOx Recycle," Fuel, 84 (16), 2005, pp. 2109-2115.
Liu, et al., "Comparisons of Pulverized Coal Combustion in Air and in Mixtures of O2/CO2," Fuel, 84 (7-8), 2005, pp. 833-840.
Nikzat, et al., "Characteristics of Pulverized Coal Burner Using a High-Oxygen Partial Pressure," Chemical Engineering Research and Design, 82 (A1), pp. 99-104.
Xue, et al., "Characteristics of a High Oxygen Participation Coal Burner," 2011 7th US National Combustion Meeting, Mar. 21-23, 2011, Presentation Slides, 17 pgs.
Xue, et al., "Characteristics of a High Oxygen Participation Coal Burner," 2011 7th US National Combustion Meeting, Atlanta, Georgia, Mar. 20-23, 2011, pp. 1-6.
International Search Report and Written Opinion for PCT/US2012/040181, mailed Oct. 9, 2013.
Toftegaard, et al, "Oxy-fuel combustion of solid fuels," Progress in Energy and Combustion Science, vol. 36, No. 5, Oct. 1, 2010, pp. 581-625.

* cited by examiner

*Primary Examiner* — Kenneth Rinehart
*Assistant Examiner* — Bao D Nguyen
(74) *Attorney, Agent, or Firm* — Christopher J. Cronin

(57) ABSTRACT

Solid particulate fuels are combusted with a primary oxidant stream of industrially pure oxygen and a secondary oxidant stream of industrially pure oxygen optionally mixed with a portion of recycled flue gas. The fuel is conveyed with a carrier gas of air or recycled flue gas. An oxygen concentration out of the total amount of the fuel stream and the primary and secondary oxidant streams is 40-63% by mass or 47-70% by volume.

1 Claim, 5 Drawing Sheets

SOLID FUEL AND OXYGEN COMBUSTION WITH LOW NOX AND EFFICIENT BURNOUT

CROSS-REFERENCE TO RELATED APPLICATIONS

None.

BACKGROUND

Carbon dioxide ($CO_2$) emissions are of current concern for power generation and for industrial sectors such as cement and steel making. Oxy-fuel combustion is considered as one of the promising technologies to capture $CO_2$ from power plants. In oxy-fuel combustion, the fuel is typically burned in an $O_2/CO_2$ environment. Successful implementation of this technology necessitates a thorough understanding of the method and operation of combustion devices for solid fuels in $O_2$ environments as well as an understanding of the influence of $O_2/CO_2$ mixtures with different oxygen concentrations.

The burner stability, $NO_x$ emission, char burnout, heat transfer to reactor walls, or gas temperature profiles have been reported for specific oxy-fuel combustion configurations. To match the temperature profile of air combustion, the oxygen level in these prior art oxy-combustion configurations have been limited, usually to less than 30%. Replacement of $N_2$ with $CO_2$ or recycled flue gas leads to changes in solid fuel particle devolatilization, ignition, and flame shape. These changes lead, in turn, to changes in furnace heat transfer, $NO_x$ emission rates, and char burnout. Studies have showed the influence of increasing oxygen concentration on devolatilization and ignition and concluded that, at higher oxygen concentration, devolatilization and ignition generally occur more rapidly.

$NO_x$ reduction is a potential advantage of oxy-fuel combustion. Oxy-fuel combustion with recycled flue gas can in some circumstances reduce $NO_x$ by about one third to one half compared to air combustion. For pulverized coal combustion in air, the total $NO_x$ is divided between about 20% thermal $NO_x$, 80-100% fuel $NO_x$, and minimal prompt $NO_x$.

The extent of combustion of coal char is of significant concern in the design of a coal-fired combustion system. Researchers have studied ignition and devolatilization of coal particles in $O_2/CO_2$ conditions and compared them with air-fired conditions. Char burnout at 21% $O_2$ in $CO_2$ takes place at a slower rate than in air. However, at 30% $O_2$ in $CO_2$ the burnout is similar and at higher $O_2$ concentrations, the char burnout proceeds much faster due to higher partial pressures of oxygen surrounding the char. Nevertheless, under $O_2/CO_2$ combustion conditions, an increase in the amount of oxygen relative to $CO_2$ necessarily requires a decrease in the amount of the $CO_2$. One of ordinary skill in the art of oxy-combustion of solid particulate fuels will readily recognize that a decrease in the amount of $CO_2$ injected as an oxidant stream will result in decreased mixing between the $CO_2$-containing oxidant stream and the solid fuel particles and that such decreased mixing will tend to outweigh any benefits associated with localized areas of higher oxygen assisting in burnout. Additionally, one of ordinary skill in the art will similarly recognize that an increase in oxygen level may bring about an increase in fuel $NO_x$.

Some researchers have investigated various aspects of oxy-combustion of solid particulate fuels but little knowledge exists on the fine balance that needs to be drawn between adding too much or too little oxygen or too much or too little $CO_2$ while still achieving good burnout and avoiding the formation of fuel $NO_x$.

Nikzat et al. described a burner with high oxygen partial pressure. "Characteristics of Pulverized Coal Burner Using a High-oxygen Partial Pressure", Chemical Engineering Research and Design, 82 (A1):99-104. That research focused on the stable combustion intensity and fundamental characteristics of the flame for different stoichiometric ratios. While the results show good burnout and low $NO_x$ emissions, the operating conditions and oxygen distribution scheme (if any) are not described.

Each of WO 2011/051463 and WO 2011/051464 disclose a solid fuel burner and a method to combust solid particles.

Still others have addressed burnout and $NO_x$ emissions for oxy-coal combustion under relatively low $O_2$ concentration conditions. Relatively low $O_2$ concentrations conceivably would produce less fuel $NO_x$ but the flame temperature is lowered by the dilution with the non-oxygen components in the carrier gas and oxidant streams. This is a significant disadvantage when a relatively hot flame is needed for greater heat transfer, especially in industrial melting furnaces or cement kilns.

In summary, there is relatively little knowledge regarding the impact upon burnout and $NO_x$ emissions for oxy-coal combustion under relatively higher $O_2$ concentrations. Thus, there is limited understanding of the necessary operating conditions for such combustion methods where good burnout and low $NO_x$ emissions are achieved.

Thus, it is an object of the invention to provide a method of oxy-combustion of a particulate solid fuel that produces a relatively hot flame and avoids the problem of undesirably high levels of fuel $NO_x$. It is another object of the invention to provide a method of oxy-combustion of a particulate solid fuel that produces a relatively hot flame and avoids the problem of poor burnout.

SUMMARY

There is provided a method for combustion of a solid fuel with low $NO_x$ emissions and satisfactory burnout. The method comprises the following steps. A flow of a primary oxidant is supplied from a first nozzle, the primary oxidant being industrially pure oxygen. A flow of fuel is supplied from a first annulus disposed between the first nozzle and a second nozzle disposed concentrically around the first nozzle, the fuel being particulate solid fuel and a carrier gas. A flow of a secondary oxidant is supplied from a second annulus surrounding and coaxial with the second nozzle. The fuel and primary and secondary oxidants are combusted to produce flue gas. A portion of the flue gas is collected and recycled. The secondary oxidant is industrially pure oxygen optionally mixed with a portion of the recycled flue gas. The carrier gas is selected from the group consisting of air and a portion of the recycled flue gas. A total amount of oxygen in the flows of primary oxidant, secondary oxidant, and fuel is 47% to 70% (vol/vol).

The method may include one or more of the following aspects:
- the particulate solid fuel is pulverized coal.
- the particulate solid fuel is pulverized petcoke.
- the carrier gas is air.
- the carrier gas is a portion of the recycled flue gas.
- the oxygen in the primary oxidant comprises at least 4% (vol/vol) of a total amount of oxygen in the flows of fuel and primary and secondary oxidants.
- the flow of fuel is swirled with a swirler disposed in the first annulus.
- the fuel swirler has a swirl angle of 15-30°.

the flow of secondary oxidant is swirled with a swirler disposed in the second annulus.

the carrier gas is industrially pure $CO_2$.

the fuel swirler has a swirl angle of up to 40°.

the secondary oxidant is industrially pure oxygen.

the secondary oxidant is a mixture of industrially pure oxygen and a portion of the recycled flue gas.

the overall concentrations of oxygen $[O_2]_{om}$ is 40-55% wt/wt, 40-49% wt/wt, 40-44% wt/wt, 44-63% wt/wt, 44-55% wt/wt, 44-49% wt/wt, 49-63% wt/wt, or 49-55% wt/wt.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
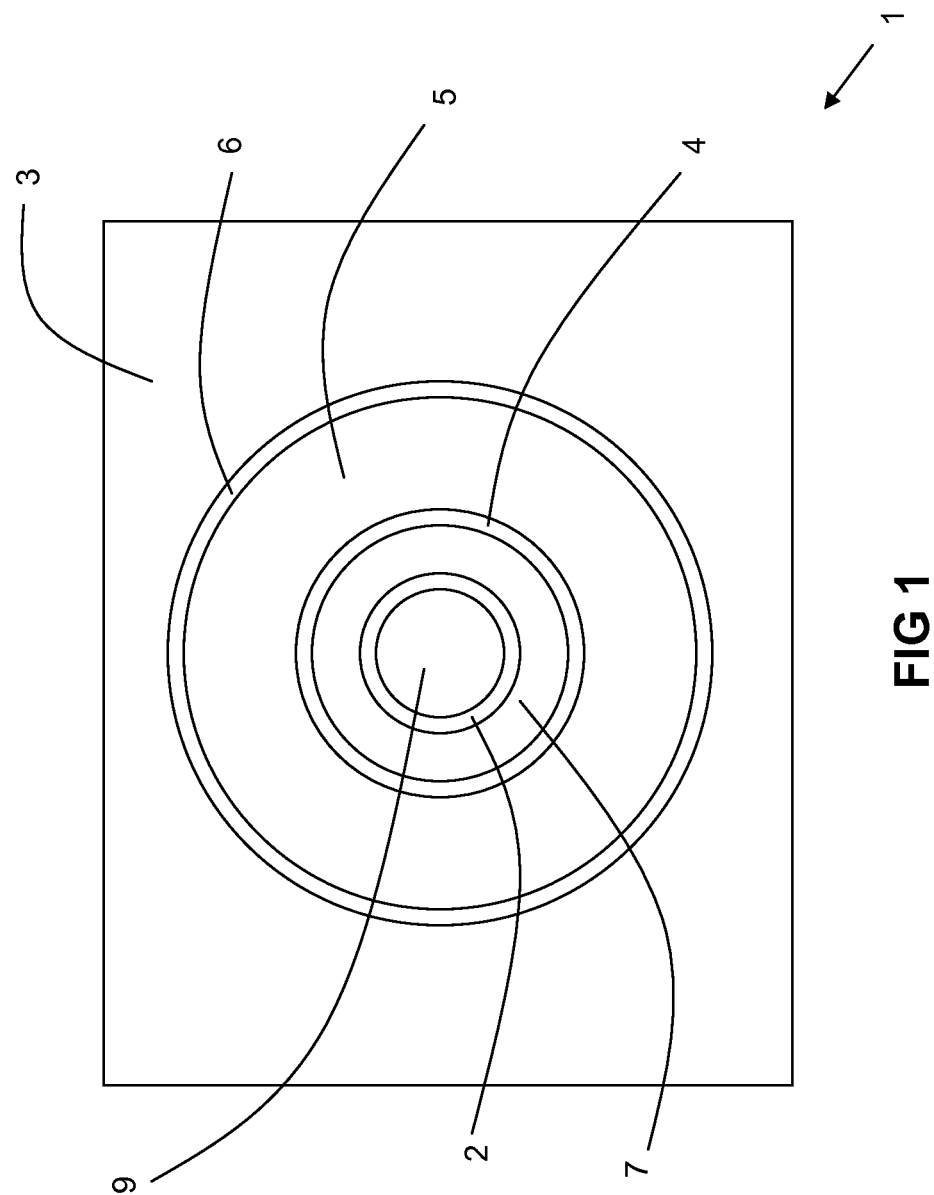
FIG. 1 is a schematic of a burner for use in the inventive method.

There is disclosed a method for combustion of a solid fuel with low $NO_x$ emissions and satisfactory burnout. As best illustrated by FIG. 1, burner 1 has first and second concentric nozzles 2, 4 where the second nozzle 4 surrounds the first nozzle 2. A flow of primary oxidant is supplied from the inside 9 of the first nozzle 2 in a burner while a flow of fuel is supplied from a first annulus 7 disposed between the first nozzle 2 and a second nozzle 4. A flow of a secondary oxidant is supplied from a second annulus 5 surrounding and coaxial with the second nozzle 4. The second annulus 5 may be circumscribed by a third nozzle 6 disposed within a burner block 3 typically made of refractory or the second annulus 5 may be circumscribed by an inner surface of a bore extending through the burner block 3 and the third nozzle 6 not employed. The primary and secondary oxidants and the fuel are combusted to produce flue gas. Some of the flue gas is recycled.

The fuel comprises particulate solid fuel and a carrier gas. The solid fuel may be pulverized coal or pulverized petcoke. The carrier gas may be industrially pure $CO_2$, a portion of the recycled flue gas or air. A minimum amount of carrier gas utilized is well known in the art and is the amount which is needed to fluidize the particulate solid fuel without incurring significant accumulation of particulate solid fuel in the fuel pipe upstream of the exit through the first annulus 7. The fuel may be swirled by utilizing a swirler disposed in the first annulus 7. While the swirler may have a swirl angle of up to 40°, typically it is between 15-30°.

While the primary oxidant is typically industrially pure oxygen for safety reasons, it may include minor amounts of other gases. The primary oxidant comprises at least 4% of a total oxidant bill consumed in combustion at the burner. While the primary oxidant may comprise up to 50% of the total oxidant bill, typically it is no more than 40%, more typically it is 4-20% of the total oxidant bill, and most typically around 10% of the total oxidant bill. The velocity of the primary oxidant is better kept at no greater than 90 m/s in order to provide greater flame stability.

The secondary oxidant is either industrially pure oxygen or a mixture of industrially pure oxygen and a portion of the recycled flue gas. The secondary oxidant may be swirled by utilizing a swirler disposed in the second annulus 5. While the swirler may have a swirl angle of up to 40°, typically it is between 15-30°. A relatively large swirl angle may result in a longer flame due to the prevalence of fuel particles not being combusted within the high oxygen concentration near the primary air. However, a relatively higher swirl angle allows a relatively greater amount of recycled flue gas in the secondary oxidant without causing the flame to become unstable and detach from the burner.

The specific purity of the industrially pure oxygen depends upon the method of production and whether or not the produced oxygen is further purified. For example, the industrially pure oxygen may be gaseous oxygen from an air separation unit that cryogenically separates air gases into predominantly oxygen and nitrogen streams in which case the gaseous oxygen has a concentration exceeding 99% vol/vol. The industrially pure oxygen may be produced through vaporization of liquid oxygen (which was liquefied from oxygen from an air separation unit, in which case it, too, has a purity exceeding 99% vol/vol. The industrially pure oxygen may be also be produced by a vacuum swing adsorption (VSA) unit in which case it typically has a purity of about 92-93% vol/vol. The industrially pure oxygen may be sourced from any other type of oxygen production technology used in the industrial gas business.

We have discovered that, relatively high levels of oxygen in relation to recycled flue gas may be employed with satisfactory $NO_x$ levels and satisfactory burnout. The presence of recycled flue gas aids in the maintenance of relatively larger reducing zones for avoidance of fuel $NO_x$. Additionally, the presence of recycled flue gas injected as a secondary oxidant helps to promote mixing between oxygen available in the secondary oxidant and solid fuel particles in the stream of fuel. Hence, burnout is improved.

Towards this end, the overall concentration of oxygen $[O_2]_{ov}$ is 47-70% vol/vol out of a total volume of the flows of primary oxidant, secondary oxidant, and fuel. Expressed in terms of mass, the overall concentration of oxygen $[O_2]_{om}$ is 40-63% wt/wt. While the amount of carrier gas may be varied, typically it is driven by the amount of particulate fuel used, so the overall oxygen concentration $[O_2]_{ov}$ or $[O_2]_{om}$ largely depends upon how much recycled flue gas is in the secondary oxidant. Thus, it may be varied if desired, by mixing different amounts of recycled flue gas and industrially pure oxygen to produce the secondary oxidant. Typical ranges of overall concentrations of oxygen $[O_2]_{om}$ are 40-55% wt/wt, 40-49% wt/wt, 40-44% wt/wt, 44-63% wt/wt, 44-55% wt/wt, 44-49% wt/wt, 49-63% wt/wt, and 49-55% wt/wt.

EXAMPLES

An oxy-coal burner employing pipe-in-pipe configuration was used in the testing. The burner had a nominal thermal input of 150 kW. The primary oxidant (industrially pure oxygen) was injected through the center nozzle. Recycled flue gas is predominantly $CO_2$. In order to simulate the effects of using recycled flue gas without requiring a conventional system for collection and recycling of the flue gas, pulverized coal was conveyed with $CO_2$ and fed through the inner annulus between the nozzles and a secondary oxidant stream of $O_2$ and $CO_2$ stream is fed through the outer annulus in between the burner block and the second nozzle.

The operating conditions are shown in Table 1. For all of the data, the coal flow rate was fixed at 18 kg/hr (~150 kW$_{th}$). The mole fraction of $O_2$ for the reactants (primary oxidant and secondary oxidant) was kept to 0.70. For oxygen sweep #1, the fraction in the $O_2$ delivered as the primary oxidant stream was varied from 4 to 50% of the total. For oxygen sweep #2, $CO_2$ was added to the secondary oxidant stream at a rate of 40 kg/hr and the $O_2$ was again varied from 4-50% (of the total oxidant bill) as the primary oxidant stream. The final sweep was completed by holding the amount of primary $O_2$ constant at 10% of the total flow and varying the $CO_2$ in the secondary stream from 0-40 kg/hr.

TABLE 1

Test matrix of coal, oxygen and $CO_2$ flow rates

| | Coal (kg/hr) | Total $O_2$ (kg/hr) | Conveying $CO_2$ (kg/hr) | Primary $O_2$ (%) | Secondary $CO_2$ (kg/hr) | $O_2/(O_2 + CO_2)$ Ratio |
|---|---|---|---|---|---|---|
| Base Case | 18.0 | 42.72 | 25.0 | 10 | 0.0 | 0.63 |
| $O_2$ Sweep #1 | 18.0 | 42.72 | 25.0 | 2.7-50 | 0.0 | 0.63 |
| $O_2$ Sweep #2 | 18.0 | 42.72 | 25.0 | 2.7-50 | 40.0 | 0.40 |
| $CO_2$ Sweep | 18.0 | 42.72 | 25.0 | 10 | 0-40 | 0.63-0.40 |

$NO_x$ Results

Figure 2:
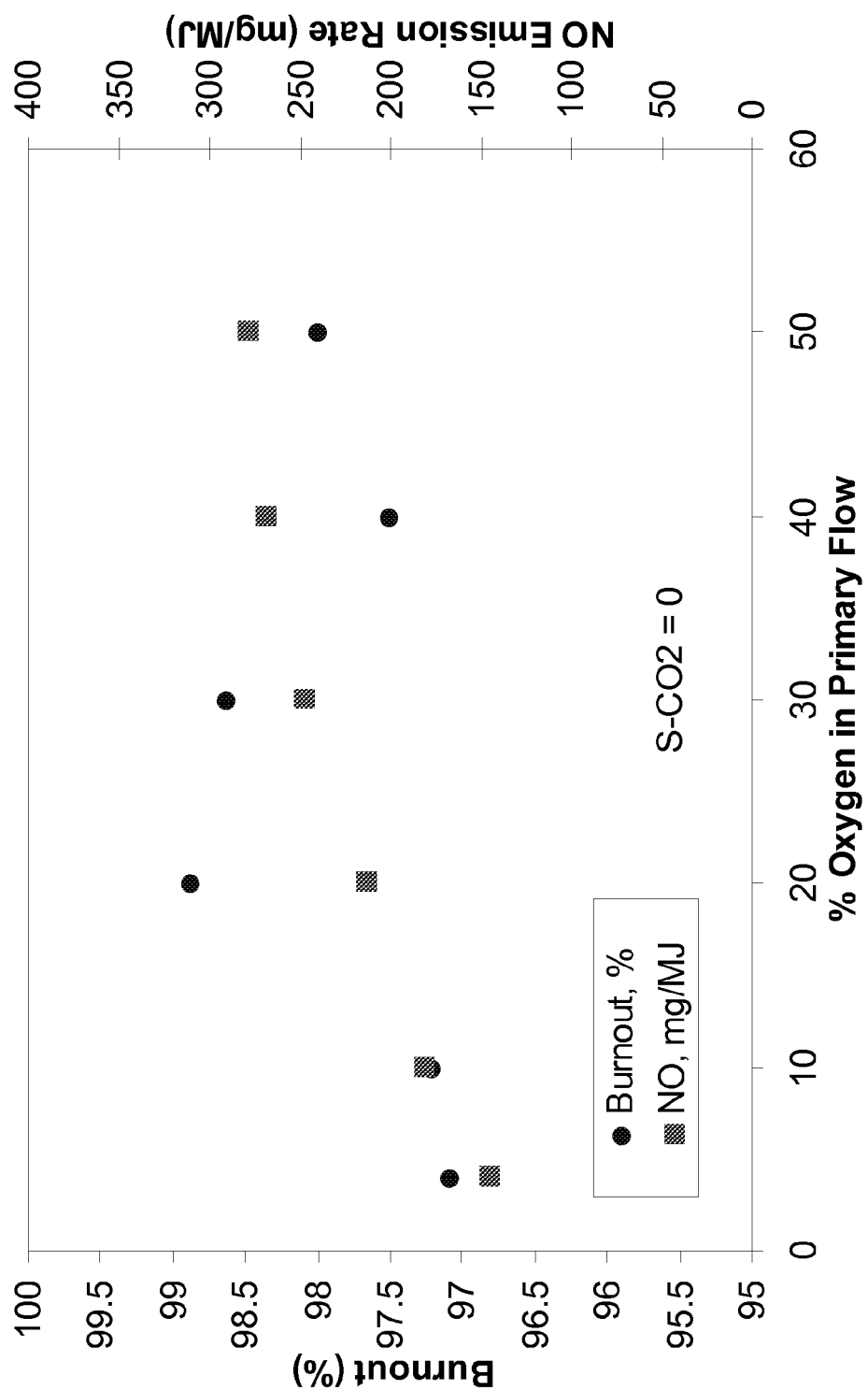
FIG. 2 is a graph of the influence of the amount of oxygen injected in the primary oxidant stream upon $NO_x$ levels and % char burnout without any $CO_2$ in the secondary oxidant stream.
Figure 3:
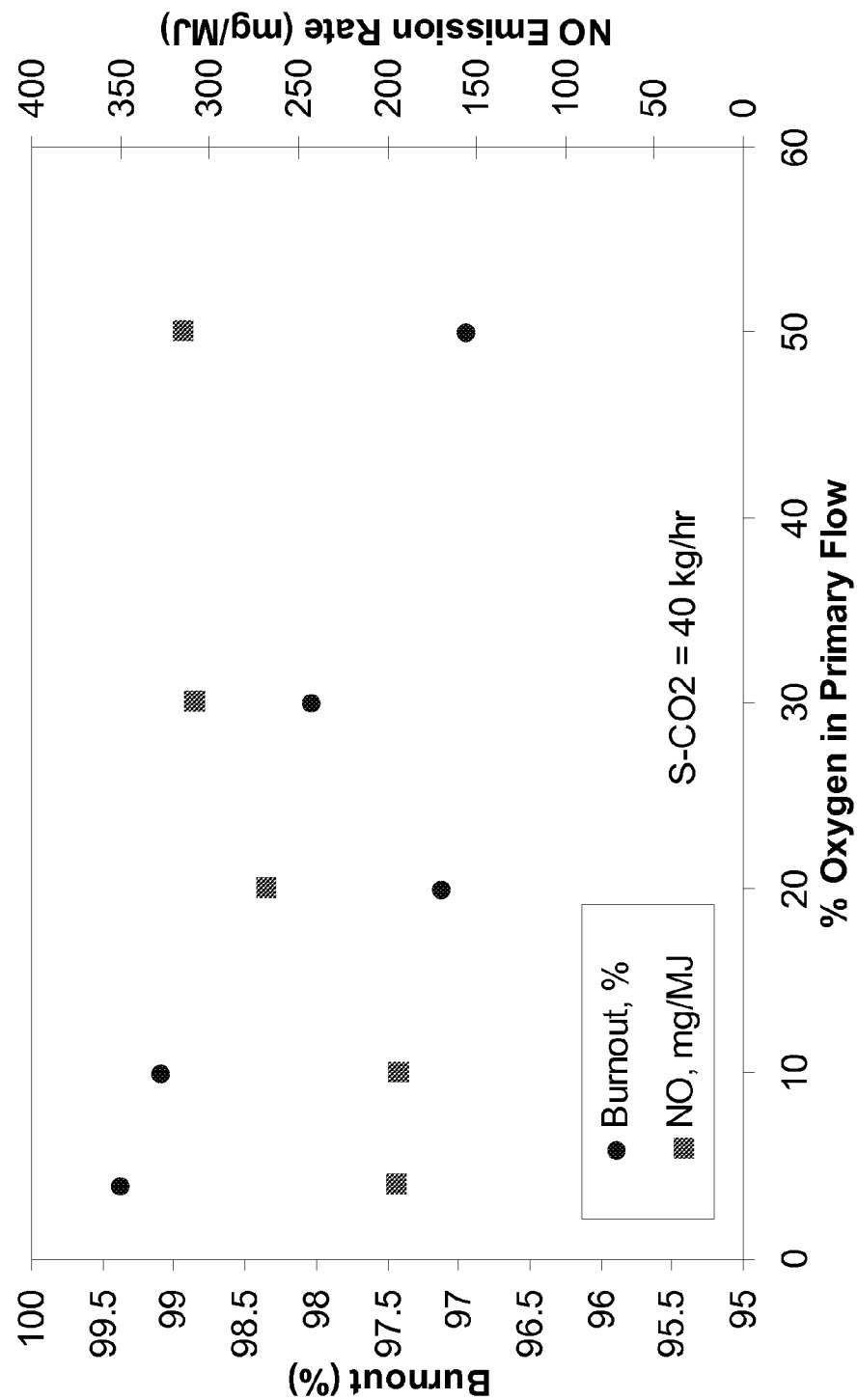
FIG. 3 is a graph of the influence of the amount of oxygen injected as the primary oxidant stream upon $NO_x$ levels and % char burnout with a fixed amount of $CO_2$ in the secondary oxidant stream.

As shown in FIGS. 2 and 3, NO emission increases as the primary oxygen flow rate increases irrespective of $CO_2$ participation in the secondary. Without being bound by any particular theory, we believe that the greater abundance of oxygen due to the higher oxygen flow rate in the primary oxidant stream has the effect of decreasing the size of the reducing zones during the coal devolatilization process. As the size of the reducing zones is decreased, there is an increase of NO. In other words, the volatiles lower NO by creating a reducing zone for the reduction of NO to $N_2$. It is important to not overly decrease the size of the reducing zones.

Figure 4:
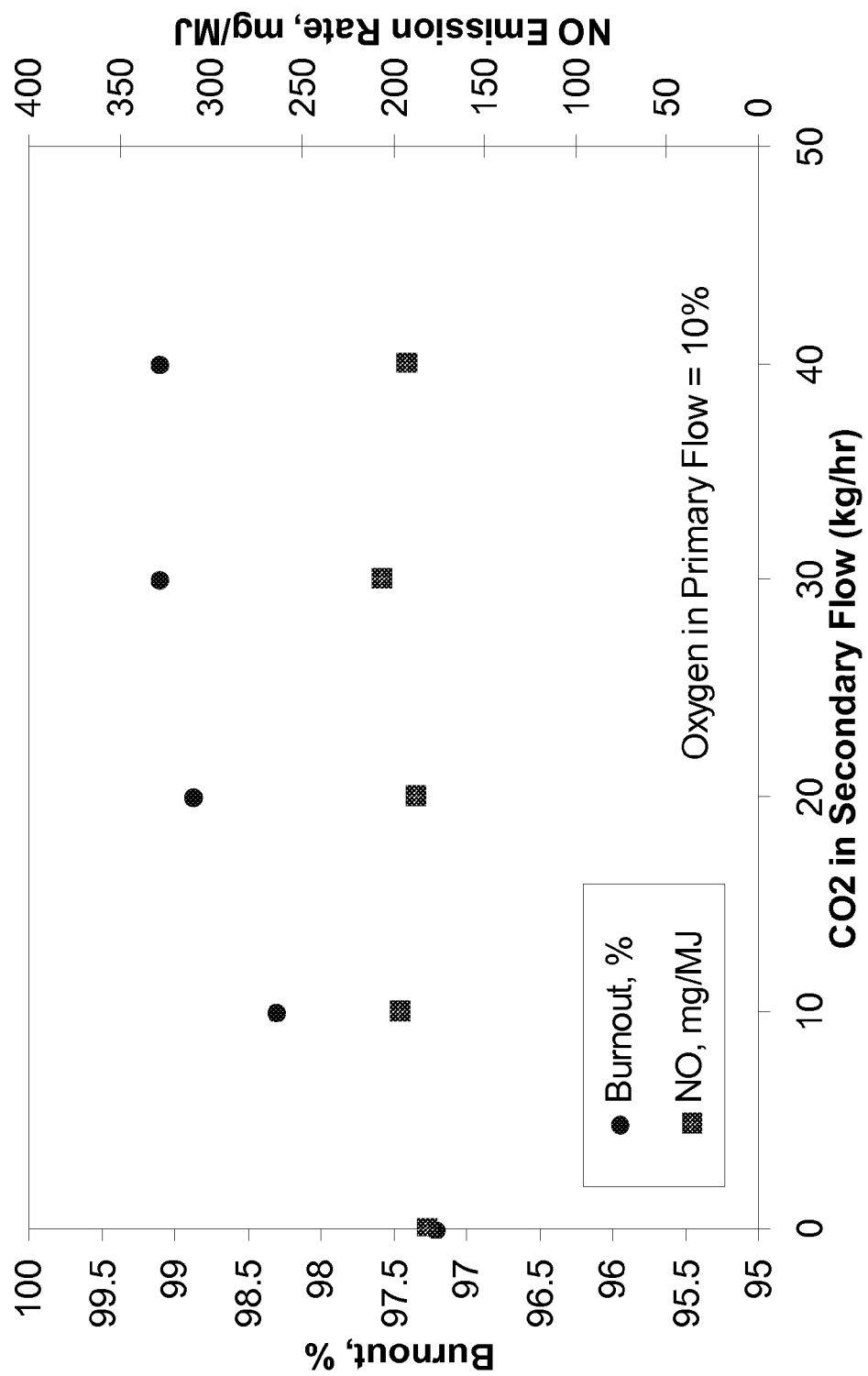
FIG. 4 is a graph of the influence of the amount of $CO_2$ injected as part of the secondary oxidant stream upon $NO_x$ levels and % char burnout with a fixed amount of oxygen injected as the primary oxidant stream.

As shown in FIG. 4, as the amount of $CO_2$ in the secondary oxidant stream increases, NO emission tends to remain relatively constant despite decreases in the amount of $CO_2$ injected as part of the secondary oxidant stream.

Figure 5:
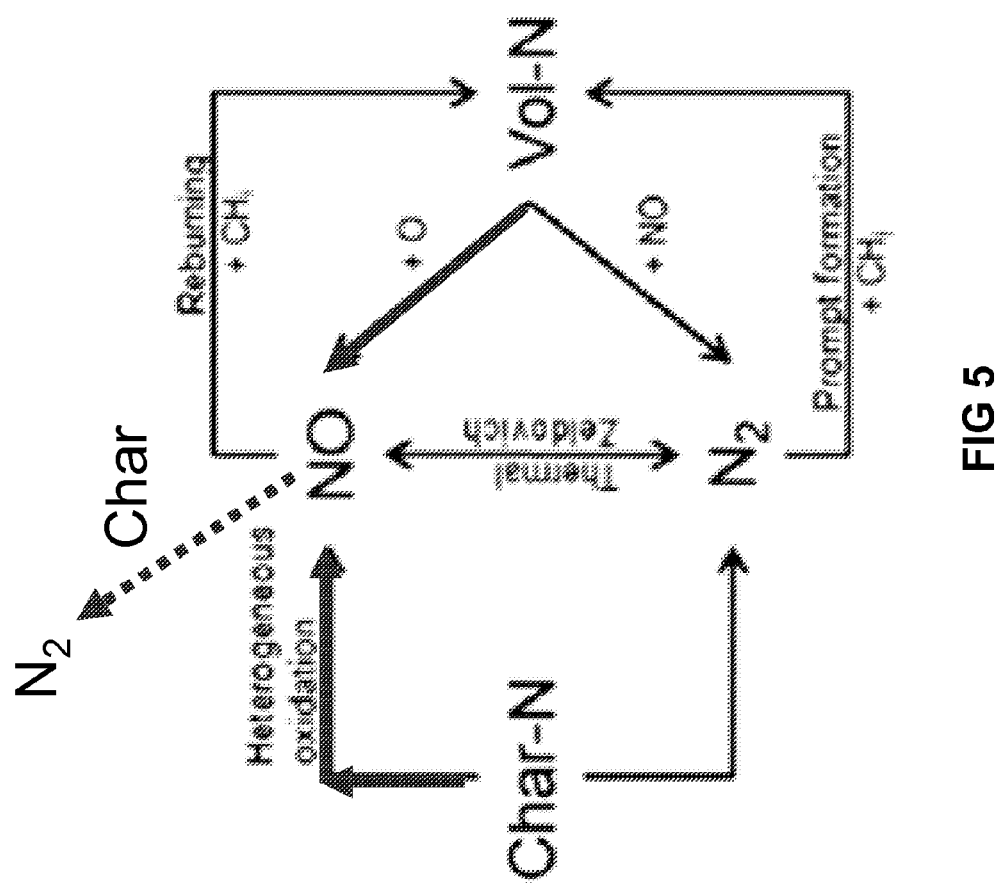
FIG. 5 is a representation of various reaction pathways during combustion of solid fuels.

As the oxygen concentration increases, the reaction between char and oxygen proceeds faster, resulting in higher particle temperatures. The fractional conversion of nitrogenous species bound to char (i.e., char-N) to NO has been reported to increase initially with temperature until the point where the oxygen-char reaction approaches the diffusion limited regime ($O_2$~50%). Any further increase in particle temperature will mainly increase the rate of NO reduction by char, which leads to a reduction in NO emissions. With reference to FIG. 5, the reaction pathways indicated with thicker lines are favored when oxygen increases. However, those pathways become saturated when $O_2$ concentration becomes above about 50%, and NO char reduction (indicated with the dotted arrow) is enhanced. Subsequently, the total NO emission starts decreasing.

Increasing primary oxygen produced the opposite effect on burnout depending on the amount of secondary $CO_2$ flow. When there was zero $CO_2$ flow in the secondary oxidizer, shifting oxygen from the secondary stream to the primary stream slightly improved burnout. When there was a high flow of $CO_2$ in the secondary stream, shifting of $O_2$ from the secondary to primary stream decreased burnout.

Burnout Results

It is well known that coal combustion proceeds through two processes: the combustion of volatiles and the oxidation of the remaining char. Generally, prolonging the mixing of the oxygen into the volatiles lowers NO. However, char oxidation is controlled by the rate of bulk diffusion of $O_2$ to the surface of particles. Oxygen availability after volatiles combustion is critical to good burnout. It is the therefore the mixing of all of the available oxygen, not just a portion of the oxygen into a burning jet of char that increases char burnout.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A method for combustion of a solid fuel with low $NO_x$ emissions and satisfactory burnout, comprising the steps of:
   supplying a flow of a primary oxidant from a first nozzle, the primary oxidant being industrially pure oxygen;
   supplying a flow of fuel from a first annulus disposed between the first nozzle and a second nozzle disposed concentrically around the first nozzle, the fuel being particulate coal and a carrier gas;
   supplying a flow of a secondary oxidant from a second annulus surrounding and coaxial with the second nozzle;
   combusting the fuel and primary and secondary oxidants to produce flue gas; and
   collecting and recycling a portion of the flue gas, wherein:
      the secondary oxidant is industrially pure oxygen mixed with a portion of the recycled flue gas, the recycled flue gas constituting 18.2-47.1% (vol/vol) of the secondary oxidant and the oxygen constituting the balance of the secondary oxidant;
      the carrier gas is a portion of the recycled flue gas;
      the primary oxygen is 2.7-10% (vol/vol) of the amount of oxygen in the flows of primary oxidant and secondary oxidant;
      a total amount of oxygen in the flows of primary oxidant, secondary oxidant, and fuel is 47% to 70% (vol/vol); and
      the percent burnout of the particulate coal being greater than 97.25% and less than 99.5%.

* * * * *